March 7, 1939.　　　　　W. W. FARR　　　　　2,150,116
VEHICLE SIDE BEARING
Filed April 27, 1937
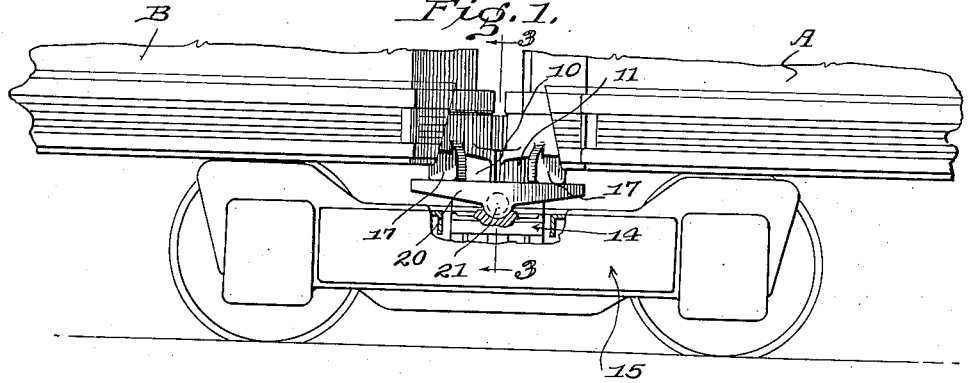
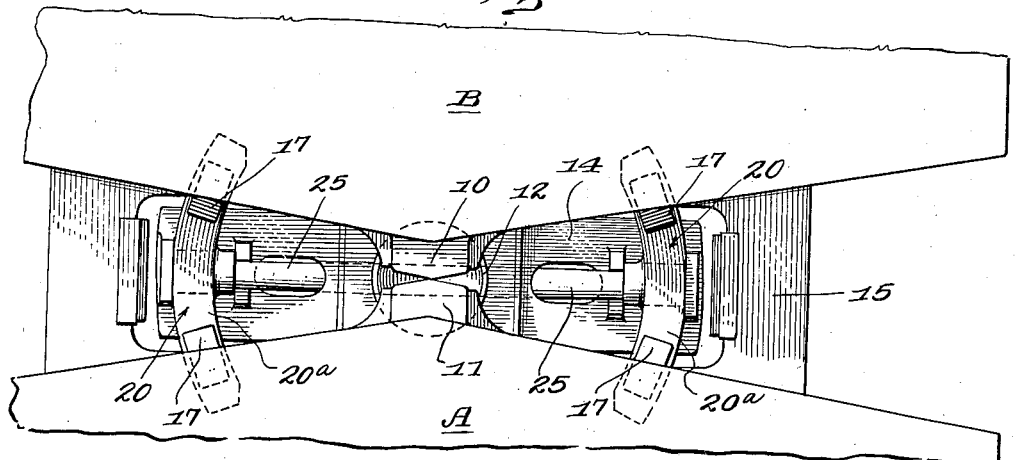
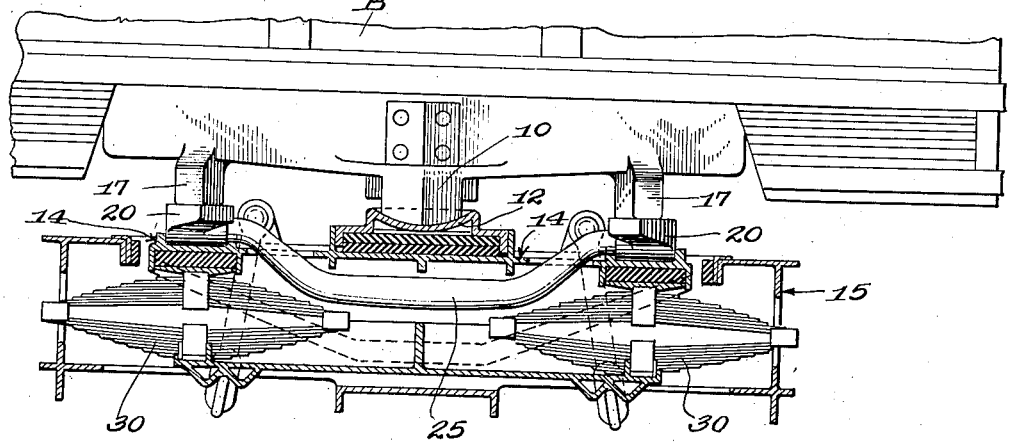
INVENTOR.
William W. Farr
BY
ATTORNEY.

Patented Mar. 7, 1939

2,150,116

UNITED STATES PATENT OFFICE 2,150,116

VEHICLE SIDE BEARING

William W. Farr, Penn Valley, Pa., assignor to Edward G. Budd Manufacturing Company, Philadelphia, Pa., a corporation of Pennsylvania Application April 27, 1937, Serial No. 139,199

5 Claims. (Cl. 105—4)

This invention relates to improvements in side bearings for vehicle bodies and more particularly in connection with articulated car bodies mounted on a common truck.

The principal object of this invention is to reduce inter-car roll between the adjacent ends of articulated car bodies.

Another object of the invention is to provide an improved side bearing supporting structure for vehicle trucks to provide improved riding qualities of the vehicle body.

Further objects and advantages of the invention will appear from the following disclosure of a preferred form of embodiment thereof taken in connection with the attached drawing, in which, Fig. 1 is a side elevation diagrammatically showing a portion of a common truck for supporting the adjacent ends of articulated cars;

Fig. 2 is a partial top plan of the interconnected portions of the car body shown in Fig. 1;

Fig. 3 is a vertical section taken substantially along the line 3—3 of Fig. 1.

It has become common practice to articulate vehicle bodies of the rail car type and this articulation is usually accomplished by providing a common truck for the adjacent ends of both car bodies with the articulation mounted over the truck bolster. As diagrammatically shown in Fig. 1, the right hand car is designated as A and the left hand car is designated as B, both cars A and B having articulated end sill bearing members 10 and 11 which, as shown in Fig. 3, may have partially spherical surfaces carried in a suitable socket 12 carried by the bolster 14 of the truck diagrammatically illustrated at 15. This center plate construction may be of any well known or preferred form.

The respective car bodies A and B are also provided with a plurality of side bearing brackets all of which are substantially alike and may be generally represented by the character 17, it being understood that pairs of brackets on one car are adjacent to pairs of brackets on the other.

The bolster 14 on the truck or the truck frame, if a swinging bolster is not used, carries pivoted side bearing arms 20 in accordance with my invention, such arms being pivoted at 21 for rotation about a horizontal axis which is transverse of the truck. Each of the arms 20 is located substantially in the plane of the side bearing brackets 17, each arm being slightly curved, as shown at 20a in Fig. 2, to provide a continuous surface regardless of the angle of curvature between the respective car bodies when they are on curved track.

The support of the respective car bodies A and B on the truck 15 is thus through the truck center plate 12 and the respective side bearing brackets 17 and side bearing arms 20. With such a construction, however, a tendency of the car body A to roll clockwise, would cause a tendency of the car body B to roll counter-clockwise, which tends to aggravate the inter-car motion on a longitudinal horizontal axis. To prevent this roll, I provide a torque arm 25 which extends from one side arm 20 to the other, as shown in Fig. 3, this torque arm being suitably keyed to the arms 20 so that they must rotate together. The arm is of sufficient rigidity that there is only a limited movement between the arms with the torque of one transmitted substantially to the other.

With such a construction, a tendency of the car A to rotate clockwise about a longitudinal horizontal axis will cause a depression of one bearing bracket 17 which will be counteracted by a tendency of the arm 20 to rotate. This rotation is directly resisted by the bracket 17 on the same end of car B and through the torque arm 25 by the bracket 17 on the opposite side of car B. In other words, the weight of the entire end of car B acts to resist the turning of car A.

If both cars A and B tend to rotate clockwise at the same time, the arms 20 act as substantially equal length bearings with the result that there is no movement of the torque arm 25 and the resistance is entirely through the normal bolster supporting springs 30. Riding of the car bodies is thus greatly improved and softer springs may be provided as each car tends to prevent roll of the other, rather than the spring suspension itself.

While I have shown a preferred form of embodiment of my invention, I am aware that modifications may be made thereto and I therefore desire a broad interpretation of my invention within the scope and spirit of the disclosure herein and of the claims appended hereinafter.

What I claim is:

1. In an articulated car, a truck, car bodies having adjacent ends carried by the truck, side bearing arms pivotally supported intermediate their ends on said truck to rock about a horizontal transverse axis, said car bodies having brackets resting on said arms on opposite sides of their pivotal support and torque transmitting means independent of the car bodies interconnecting said arms to constrain them to move together.

2. In an articulated car, two car bodies, a truck common to said two car bodies and supporting their adjacent ends, side bearings including a pair of arms pivoted to said truck, said bearing brackets extending from the car bodies and supported on opposite sides of the pivots of the respective arms and means independent of the car bodies to connect said arms together for substantially equal rotation about their pivots.

3. A truck for use in supporting adjacent ends of articulated cars comprising a center bearing and side bearings adapted to cooperate, respectively, with corresponding bearings on the car bodies to be associated therewith, the side bearings on said truck being pivoted to rock about a transverse axis intermediate their ends and being rigidly connected together independently of the car bodies to be associated therewith by a torque transmitting arm constraining them to move together.

4. In an articulated car, a truck, a plurality of car bodies having their adjacent ends centrally mounted on said truck, and side bearings on opposite sides of said truck, each cooperating with side bearings on the adjacent car ends, the side bearings on the truck each being tiltable about a transverse axis disposed between the parts thereof engaging the cooperating side bearings on the adjacent car ends, said side bearings on the truck being rigidly connected independently of the car bodies to prevent inter-car roll in opposite directions about a longitudinal axis.

5. In an articulated car, a truck, a plurality of car bodies having their adjacent ends centrally mounted on said truck, and side bearings on opposite sides of said truck each cooperating with side bearings on the adjacent car ends, said side bearings on the truck each being centrally pivoted on a transverse axis between the cooperating side bearings on the adjacent car ends, said side bearings on the truck being rigidly interconnected independently of the car bodies by torque transmitting means which constrains them to swing together whereby rolling of the car bodies in opposite directions is substantially prevented.

WILLIAM W. FARR.